United States Patent Office 3,726,839
Patented Apr. 10, 1973

3,726,839
FIRE RETARDANT CROSSLINKED COPOLYMERS OF A BIS(HYDROCARBYL) PHOSPHONATE WITH A POLYFUNCTIONAL ETHYLENICALLY UNSATURATED MONOMER
Jung Il Jin, Irvington, N.Y., assignor to Stauffer Chemical Company, New York, N.Y.
No Drawing. Filed Oct. 28, 1970, Ser. No. 84,871
Int. Cl. C08f 3/62, 15/26, 15/40
U.S. Cl. 260—78.5 CL                9 Claims

ABSTRACT OF THE DISCLOSURE

There are disclosed crosslinked copolymers of: (1) a bis(hydrocarbyl) vinylphosphonate, particularly bis(beta-chloroethyl) vinylphosphonate; (2) a polyfunctional ethylenically unsaturated monomer; and (3) as an optional component one or more monofunctional vinyl comonomers. These crosslinked copolymers may be used, per se, as flame retardant materials or they may be blended with various thermoplastic polymers in order to reduce their flammability.

BACKGROUND OF THE INVENTION

As is known to those skilled in the art, it is quite difficult to prepare solid, high molecular weight homopolymers of the bis(hydrocarbyl) vinylphosphonates such as bis(beta-chloroethyl) vinylphosphonate. It is also difficult to prepare high molecular weight copolymers of these vinylphosphonates wherein they are present in proportions which substantially exceed about 50%, by weight. The preparation of such homo- or copolymers of these vinylphosphonates is, of course, highly desirable inasmuch as they are characterized by a high degree of fire retardancy; the latter property being particularly useful for the various reasons which will be set forth hereinbelow.

Thus, many thermoplastic polymers such, for example, as the homo- and the copolymers of methyl methacrylate, polyolefins, polystyrene and acrylonitrile-butadiene-styrene resins are hard and, in many instances, optically clear materials which are widely utilized for the preparation of a broad range of consumer and industrial articles. As normally prepared, these thermoplastic polymers will ignite and continue to burn upon exposure to flames or high temperatures. However, in many instances, particularly where they are being considered for use in building interiors or in applications requiring their prolonged exposure to high temperatures, it is highly desirable that such polymers should display fire or flame retardant properties so that they may either meet the standards set by various building codes or so that they may be safely employed in place of more costly materials.

Prior attempts to provide fire retardant, thermoplastic polymer compositions have involved the use of a variety of extraneous additives such, for example, as antimony oxides, halogenated paraffins, halogenated hydrocarbons and low molecular weight phosphate esters. However, the effective utilization of these and other additives has ordinarily required their presence in rather high concentrations which adversely affected the physical properties of the treated polymers. Thus, the inherent hardness and, in some instances, the clarity of the thermoplastic polymers were particularly prone to deterioration in the presence of the high concentrations of these additives which were necessary in order to achieve a self-extinguishing polymer composition.

It is, therefore, the prime object of this invention to provide a means for preparing solid, high molecular weight copolymers capable of containing as much as about 98%, by weight, of one or more bis(hydrocarbyl) vinylphosphonates. It is a further object of this invention to utilize such copolymers either per se as fire retardant materials or as polymeric additives which may be blended with burning thermoplastic polymers, i.e. with thermoplastic polymers which will continue to burn upon being ignited, in order to enhance their fire retardant characteristics without adversely affecting the inherent physical properties such as hardness and, in some instances, the clarity of the thus modified polymers. Various other objects and advantages of this invention will be apparent from the disclosure thereof which follows hereinafter.

TECHNICAL DISCLOSURE OF THE INVENTION

It has now been found that solid, high molecular weight products containing as high as about 98%, by weight, of one or more bis(hydrocarbyl) vinylphosphonates, and particularly bis(beta-chloroethyl) vinylphosphonate, can be prepared by polymerizing the selected vinylphosphonate monomer with one or more polyfunctional ethylenically unsaturated monomers so as to yield a crosslinked copolymer. These crosslinked vinylphosphonate copolymers, which may also optionally contain one or more monofunctional vinyl comonomers, display excellent fire retardancy characteristics and may be used per se or blended with burning thermoplastics in order to provide them with a high degree of fire retardancy without resulting in any significant effects upon any of their physical properties such, for example, as their hardness. Moreover, it is truly surprising and advantageous to find that the polymers resulting from the process of this invention display an outstanding degree of ease of blending with the substrate system. Thus, it is well known to those skilled in the art that physical blends of two or more polymers are almost always characterized by their inherently poor mixing.

It should be noted, at this point, that the use of the term "crosslinked" in describing the copolymers resulting from the process of this invention will indicate to those skilled in the art that they possess a highly intermeshed, three-dimensional configuration or network rather than a simple linear or branched structure of the type found in non-crosslinked copolymers. Thus, such "crosslinked" polymers may be further characterized by the fact that they will not lose more than about 20% of their total weight upon being extracted with methanol in a Soxhlet extractor.

The novel copolymers of this invention are thus seen to comprise crosslinked copolymers of: (1) one or more polyfunctional ethylenically unsaturated monomers, i.e. one or more monomers containing two or more polymerizable, ethylenically unsaturated bonds. Suitable difunctional monomers include allyl methacrylate, divinyl benzene, diethylene glycol dimethacrylate, ethylene glycol dimethacrylate, trimethylolpropane trimethacrylate, methylene-bis-acrylamide, diethylene glycol diacrylate, ethylene glycol diacrylate, divinyl ether, diallyl fumarate, diallyl phthalate, divinyl sulfone, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and diallyl phosphonates. Optimum results are, however, obtained by the use of allyl methacrylate since its use leads to a substantially greater degree of conversion of the vinylphosphonate monomer to the desired copolymer, (2) one or more bis(hydrocarbyl) vinylphosphonates having the structure:

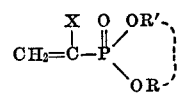

wherein X is selected from the group consisting of hydrogen, halogen, cyano, aryl such as phenyl, haloaryl $C_1$–$C_{18}$ alkyl, $C_1$–$C_{18}$ haloalkyl and

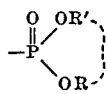

wherein R and R′ are hydrocarbyl and substituted hydrocarbyl groups consisting essentially of hydrogen and carbon and containing up to about 18 carbon atoms inclusive with the proviso that R and R′ may be the same, different or conjoint, i.e. R and R′ may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e. with any group which does not interfere with the polymerization of the bis(hydrocarbyl) vinyl phosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R′ are alkyl groups, such as methyl, ethyl, propyl, butyl, pentyl, hexyl, nonyl, pentenyl and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R′ include phenyl, benzyl, phenethyl, tolyl and naphthyl groups and the like.

Representative of the above depicted bis(hydrocarbyl) vinylphosphonates are:

Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

From the above group of bis(hydrocarbyl) vinylphosphonate monomers, it is preferred to employ bis(beta-chloroethyl) vinylphosphonate in preparing the novel crosslinked copolymers of this invention since the latter monomer is a commercially available material and lower in cost than any of the other bis(hydrocarbyl) vinylphosphonates. It is to be noted, at this point, that the use of the term "copolymer" in this disclosure is meant to apply to polymers derived from two, three or more distinct monomer species.

In addition to the above described bis(hydrocarbyl) vinylphosphonates, it is also possible to prepare copolymers useful as flame retardant additives for thermoplastic polymers by employing: (1) mono(alkyl) acid vinylphosphonates such, for example, as mono(ethyl) hydrogen vinylphosphonate, mono(butyl) hydrogen vinylphosphonate, mono(octyl) hydrogen vinylphosphonate; mono(beta-chloroethyl) hydrogen vinylphosphonate, mono(omega-chlorooctyl) hydrogen vinylphosphonate; (2) mono(cycloalkyl) and mono(aryl) hydrogen vinylphosphonates such, for example, as mono(cyclohexyl) hydrogen vinylphosphonate, mono(phenyl) hydrogen vinylphosphonate, mono(benzyl) hydrogen vinylphosphonate; (3) bis(cycloalkyl) and bis(aryl) vinylphosphonates such, for example, as bis(cyclohexyl) vinylphosphonate and bis(benzyl) vinylphosphonates; and, (4) bis(alkyl), bis(cycloalkyl), and bis(aryl) allylphosphonates such, for example, as bis(beta-chloroethyl) allylphosphonate, bis(cyclohexyl) allylphosphonate and bis(benzyl) allylphosphonate as well as mixtures of any two or more of the above described phosphonate monomers.

As has been noted, the copolymers of this invention may also, if desired, contain one or more optional monofunctional vinyl comonomers, i.e. monomers containing only one ethylenically unsaturated group, including vinyl halides such as vinyl chloride, vinyl bromide, vinyl fluoride and trifluoroethylene; vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; and, $C_1$–$C_{20}$ alkyl vinyl ethers such as methyl vinyl ether, ethyl vinyl ether and stearyl vinyl ether. Preferred for use as optional comonomers are the vinyl halides particularly vinyl chloride; the vinylidene halides, particularly vinylidene chloride; the vinyl aryl compounds particularly styrene and the lower alkyl esters of acrylic and methacrylic acids.

With respect to proportions, the novel crosslinked copolymers of this invention may contain from about 3–98%, by weight, of one or more of the above described bis(hydrocarbyl) vinylphosphonates, from about 2–60%, by weight, of one or more of the above described polyfunctional vinyl monomers and from 0 to about 90%, by weight, of one or more of the above described optional monofunctional vinyl comonomers. A preferred product is a crosslinked copolymer containing from about 20 to 80%, by weight, of bis(beta-chloroethyl) vinylphosphonate, from about 5 to 20%, by weight, of a polyfunctional ethylenically unsaturated monomer, particularly allyl methacrylate, and from 20 to 60%, by weight, of optional monofunctional vinyl comonomers.

It should again be emphasized that the ability to be able to prepare these crosslinked copolymers so that they may contain substantially more than about 50%, by weight, of a vinylphosphonate is truly surprising and unexpected. Thus, for example, U.S. Pat. No. 3,489,706, which issued Jan. 13, 1970, broadly discloses the preparation of copolymers containing up to about 50%, by weight, of a vinylphosphonate. However, a reading of its working examples reveals that none of the copolymers whose actual preparation is described therein contains more than about 25%, by weight, of the vinylphosphonate monomer.

The crosslinked copolymers of this invention may be prepared by means of any convenient free radical initiated polymerization technique known to those skilled in the art including such procedures as suspension, emulsion and solution polymerization.

Thus, in preparing these crosslinked copolymers by means of a suspension polymerization technique, the reaction is conducted in an aqueous medium containing from about 0.01 to 5%, as based on the total weight of the monomer mixture, of a suspension agent such, for example, as gelatin, starch, hydroxymethyl cellulose, hydroxyethyl cellulose, hydroxypropyl cellulose, carboxymethyl cellulose, talc, clay, polyvinyl alcohol and the like. As a catalyst for the polymerization, one may use from about 0.05 to 5%, as based on the total weight of the monomer mixture, of a monomer soluble azo or peroxide catalyst such, for example, as azobisisobutyronitrile, lauroyl peroxide, benzoyl peroxide, isopropylperoxy dicarbonate, t-butyl peroxypivalate and the like.

Polymerization may ordinarily be initiated by heating the system to a temperature in the range of from about 20 to 150° C. for a period of from about 5 to 24 hours with agitation being applied throughout the course of the reaction. The resulting product will comprise an aqueous suspension of the desired copolymers which will be in the form of particulate solids having a resin solids content in the range of from about 5 to 60%, by weight. These copolymer particles will have a particle size in the range of from about 2 to 500 microns with a range of from about 50 to 250 microns being preferred when these copolymers are to be used as additives for preparing flame retardant, thermoplastic polymers.

In preparing these copolymers by means of an emulsion polymerization procedure, the selected monomers are dispersed in an aqueous medium containing from about 0.03 to 10%, by weight of the monomers, of one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohol and the alkyl aryl polyether sulfate salts. The aqueous monomer emulsion is then heated for about 5 to 24 hours at a temperature of from about 0 to 150° C. in the presence of from about 0.05 to 5%, by weight of the monomer mixture, of a water soluble free radical initiating catalyst such, for example, as ammonium, sodium or potassium persulfate, hydrogen peroxide or a redox system comprising a mixture of a persulfate with an alkali metal bisulfite, thiosulfate or hydrosulfite.

And, in preparing the crosslinked copolymers of this invention by means of a solution polymerization procedure, the selected monomers are first dissolved in an organic solvent such, for example, as benzene, toluene cyclohexanone, acetone, tetrahydrofuran, trichloroethylene, dimethylformamide or dimethylsulfoxide. The resulting solution is then heated for from about 5 to 24 hours at a temperature of from about 20 to 120° C. in the presence of a monomer soluble azo or peroxide catalyst as exemplified by the compounds listed, hereinabove, in describing the suspension polymerization process.

Specific copolymer compositions which have been found to provide particularly good results as additives for the preparation of fire retardant, thermoplastic polymer composition are a copolymer of bis(beta-chloroethyl) vinylphosphonate, vinyl chloride and allyl methacrylate; a copolymer of bis(beta-chloroethyl) vinylphosphonate, styrene and allyl methacrylate; a copolymer of bis(beta-chloroethyl) vinylphosphonate, ethylene glycol dimethacrylate and vinyl bromide; and, a copolymer of bis(beta-chloroethyl) vinylphosphonate, allyl methacrylate and vinylidene chloride.

In all cases, the novel crosslinked copolymers of this invention have been found to provide blends with thermoplastic polymers which are characterized by their outstanding fire retardancy, their ease of blending and their retention of physical properties such as hardness, tensile and impact strength. As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread. This property may be conveniently evaluated by means of any of the standard flame retardancy tests such, for example, as the ASTM test D–635. In brief, this test involves preparing 5" x ½" x 0.05" specimens from the respective sheets. These specimens are then suspended so that their 5" dimension is horizontal and their ½" dimension is inclined at a 45° angle. One end of the thus suspended specimen is then contacted, for 30 second periods, with a one inch high flame from a ⅜" diameter barrel Bunsen burner fitted with a 1⅞" wide wing top.

In addition to being used as fire retardant additives for the preparation of thermoplastic polymer compositions, the bis(hydrocarbyl) vinylphosphonate copolymers of this invention may be used in any of the various coating, adhesive, laminating, impregnating and molding applications known to those skilled in the art. Thus, they may be coated upon and/or absorbed by all types of substrates to which it is desired to impart fire retardant properties. They may, therefore, be used as coatings, impregnants, fillers, laminants, and adhesives for such substrates as wood; paper; metals; textiles based on either natural or synthetic fibers or blends thereof; synthetic polymer films such as those based upon polyolefins, regenerated cellulose, i.e. cellophane, polyvinyl chloride, polyesters and the like; leather; natural and synthetic rubber; fiberboard; and synthetic plastics prepared by means of either addition or condensation polymerization techniques.

In addition, any desired thermoplastic polymers may be blended with the above described bis(hydrocarbyl) vinylphosphonate copolymers in order to prepare fire retardant compositions. Such thermoplastic polymers include:

(1) Polymethyl methacrylate, as well as copolymers of methyl methacrylate with minor proportions of one or more alpha, beta-ethylenically unsaturated monomers which are polymerizable therewith including: the $C_1$–$C_8$ alkyl, cycloalkyl and bicycloalkyl esters of acrylic acid and the $C_2$–$C_8$ alkyl, cycloalkyl and bicycloalkyl esters of methacrylic acid such, for example, as ethyl acrylate and methacrylate, butyl methacrylate, ethylhexyl methacrylate, norbornyl acrylate, and cyclohexyl acrylate; vinyl aryl compounds such, for example, as alpha-methyl styrene and styrene; and, nitriles of alpha, beta-ethylenically unsaturated carboxylic acids such, for example, as acrylonitrile and methacrylonitrile. From the above given group, the use of the $C_1$–$C_{18}$ alkyl esters of acrylic acid, particularly ethyl acrylate, and of the $C_2$–$C_8$ alkyl esters of methacrylic acid is preferred.

(2) Acrylonitrile-butadiene-styrene resins, commonly referred to as "ABS" resins which generally comprise either a mixture of a 60 to 80:40 to 20 styrene:acrylonitrile copolymer with from about 10 to 40%, by weight of a 5 to 40:95 to 60 acrylonitrile:butadiene copolymer or a mixture of a 60 to 80:40 to 20 styrene:acrylonitrile copolymer with from about 10 to 40%, by weight, of a graft of the latter copolymer onto polybutadiene.

(3) Poly(alpha-olefins) such as polypropylene and polyethylene and copolymers of one or more alpha-olefins, such as ethylene or propylene, with a minor proportion of one or more ethylenically unsaturated monomers including 4-methyl pentene-1; butene-1; norbornene and its derivatives; cyclopentadiene; cyclopentene; cyclobutene; vinyl acetate, the $C_1$–$C_{12}$ alkyl acrylate and methacrylate esters; as well as blends of the homo- and copolymers of alpha-olefins with other types of thermoplastic polymers.

(4) Styrene-butadiene rubber (SBR) systems comprising about 3 parts of butadiene copolymerized with one part of styrene.

(5) Polystyrene and copolymers of styrene or alpha-methyl styrene with a minor proportion of one or more ethylenically unsaturated comonomers such, for example, as nitriles of ethylenically unsaturated carboxylic acids including acrylonitrile and methacrylonitrile; and $C_1$–$C_{12}$ alkyl esters of acrylic and methacrylic acid such, for example, as methyl methacrylate and 2-ethylhexyl acrylate; and graft copolymers of styrene or alpha-methylstyrene with polybutadiene and other hydrocarbon elastomers.

(6) Cellulosic resins including cellulose esters and mixed esters such, for example, as cellulose nitrate, cellulose acetate, cellulose butyrate, cellulose propionate, cellulose acetate-butyrate, cellulose acetate-propionate and cellulose ethers such, for example, as ethyl cellulose.

(7) Polyamide resins, i.e. the resins made by the condensation of di- or polyamines with di- or polybasic acids or by polymerization of lactams or amino acids. Typical polyamides include: nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and nylon 11 made from 11-amino undecanoic acid.

(8) Polyester resins, i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition.

(9) Polyurethane resins, i.e. the resins formed by the reaction between a bi- or polyfunctional hydroxyl containing compounds, such as a polyether or polyesters, and a di- or polyisocyanate such as toluene diisocyanate or diphenylmethane-4,4'-diisocyanate.

(10) Polycarbonate resins, i.e. the resins derived from the reaction between a difunctional alcohol or phenol, such as bisphenol A, and phosgene or an alkyl or aryl carbonate.

(11) Polyacetal resins, i.e. the resins derived from the anionic polymerization of formaldehyde to obtain a linear molecule of the type —O—$CH_2$—O—$CH_2$—O—$CH_2$—.

(12) Polyphenylene oxide resins made by the oxidative polymerization of 2,6-dimethylphenol in the presence of a copper-amine-complex catalyst.

(13) Polysulfone resins, i.e. the resins containing an $SO_2$ linkage as derived from the reaction of sulfur dioxide with olefins such as 1-butene or, more preferably, by reaction of bisphenol A with 4,4'-dichlorodiphenyl sulfone.

(14) The acrylate:styrene:acrylonitrile resins, commonly referred to as "ASA" resins, which comprise a copolymer containing a major proportion of a $C_2$–$C_8$ alkyl acrylate elastomer upon which is grafted about 80–72% of the weight of the latter copolymer of a 70–80:30–20 styrene:acrylonitrile copolymer.

(15) Polyvinyl chloride and the copolymers of vinyl chloride with a minor proportion of one or more vinyl comonomers such as the vinyl alkyl esters, as exemplified by vinyl acetate, as well as any of the monomers listed, hereinabove, as applicable for use in preparing copolymers with methyl methacrylate.

(16) Polymethacrylonitrile and the copolymers of methacrylonitrile with a minor proportion of one or more comonomers such, for example, as styrene and alpha-methyl styrene.

In effect, one may utilize any thermoplastic polymer, i.e. any polymer that may be softened by heat and then regain its original properties on cooling, in preparing fire retardant compositions with the novel crosslinked copolymers of this invention.

The actual blending of the copolymer additives of this invention with the selected polymeric substrate, i.e. with any one or more of the above described thermoplastic polymers, may be accomplished by means of any convenient procedure which will result in an intimate admixture of the additive within the mass of the substrate polymer. Thus, for example, an aqueous suspension containing the particles of the copolymer additive may simply be blended or otherwise admixed with the substrate polymer which should, preferably, be in the form of an aqueous latex or suspension. Or, if desired, the copolymer additive and the thermoplastic polymer substrate may be admixed while each is in the form of a solid powder.

The blending operation may also be carried out by means of a procedure in which the thermoplastic polymer which comprises the substrate is itself polymerized while in the presence of an aqueous emulsion or suspension or organic solvent solution containing one or more of the previously polymerized copolymer additives of this invention. Alternatively, the bis(hydrocarbyl) vinylphosphonate containing copolymer additive may be polymerized in a system which contains the previously polymerized selected thermoplastic polymer substrate in an appropriate physical form, e.g. as an aqueous suspension or emulsion or as an organic solvent solution.

With respect to proportions, the amount of bis(hydrocarbyl) vinylphosphonate containing crosslinked copolymer which may be admixed with a thermoplastic polymer substrate will depend, primarily, upon such factors as the particular phosphonate copolymer and thermoplastic polymer substrate which are to be blended with one another, the degree of fire retardancy desired in the resulting blend, the degree of clarity, hardness and other specific physical properties which are sought as well as other technical and economic considerations known and understood by those skilled in the art. However, in order to attain a composition which will be self-extinguishing, it is generally desirable to introduce an effective concentration of the bis(alkyl) vinylphosphonate crosslinked copolymer additive which will be sufficient to provide the resulting blend with at least about 0.5%, by weight, of phosphorus. Thus, depending upon the concentration of the vinylphosphonate in the crosslinked copolymer additive, the thermoplastic polymer compositions of this invention will contain from about 5 to 80%, by weight, of one or more of these crosslinked copolymers.

The fire retardant, thermoplastic polymer compositions of this invention can be prepared so as to contain various optional additives which may include plasticizers such as the alkyl esters of phthalic, adipic and sebacic acids such, for example, as dioctyl phthalate and ditridecyl phthalate and aryl phosphate esters such, for example, as diphenyl and tricresyl phosphate, etc.; lubricants and mold release agents such as stearic acid or its metal salts, petroleum based waxes, mineral oils, polyethylene waxes, etc.; and heat and light stabilizers such as barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

These thermoplastic polymer compositions may also contain fillers, pigments, dyes, opacifying agents, decorative additives such as reflective metal foils or flakes, and other imbedded solid objects such as fiber glass, textile fibers, asbestos, paper, and the like, provided that they do not detract from the flame retardancy of these products. In addition, the compositions may contain other flame retardants such as antimony compounds, halogenated alkyl phosphates or phosphonates, alkyl acid phosphates, or small concentrations of phosphoric acid.

The novel fire retardant compositions of this invention, comprising blends of any of the above described thermoplastic polymers with one or more of the novel fire retardant, crosslinked copolymer additives of this invention, may be utilized in any of the coating, impregnating and especially in the molding applications known to those skilled in the art wherein it is desired to provide fire retardancy to the resulting end product. For example, these compositions may be used for preparing such diverse items as calendered films, blow molded bottles, extruded flat bed and blown films, extruded and shaped articles such as panels, tubes, sheets, rods, fibers and particularly in polypropylene and other polyolefin fibers and in carrying out such processes as injection molding, fluidizing bed coating, electrostatic powder spraying and rotational coating, etc. More particularly, those compositions which are optically clear such, for example, as those based upon homo- or copolymers of methyl methacrylate or homo- or copolymers of styrene may be utilized for preparing such articles as lenses, aircraft canopies, windows, windshields, lighting fixtures, and advertising displays. Applications wherein optical clarity is not essential include such automotive applications as seat backs, door panels, instrument panels, heat rests, arm rests, package shelves, plated hardware, radiator grills, fender extensions and liners, wheels covers and gas tanks. Non-automotive applications include their use as structural and decorative components for both the interiors and exteriors of conventional houses and mobile homes and as structural and decorative elements of business machines and electrical appliances.

The following examples will further illustrate the embodiment of this invention. In these examples, all parts given are by weight unless otherwise noted.

EXAMPLE I

This example illustrates the preparation of a crosslinked bis(hydrocarbyl) vinylphosphonate copolymer as well as its subsequent use in preparing a fire retardant, thermoplastic polymer composition. In this case, the crosslinked copolymer is a 80:20 bis(beta-chloroethyl) vinylphosphonate; allyl methacrylate copolymer prepared by means of a suspension polymerization procedure.

Part A.—Eighty (80) parts bis(beta-chloroethyl) vinylphosphonate and 20 parts allyl methacrylate are polymerized in a solution of 0.5 part methyl cellulose in 300 parts of deionized, distilled water which also contains 2 parts of benzoyl peroxide as an initiator. The polymerization mixture is stirred at 80° C. for 15 hours under a blanket of nitrogen. The crosslinked copolymer is isolated by filtration followed by washing with water and drying at 70° C. for 24 hours. A yield of 93% is obtained. The product contains 10.0% of phosphorus and 23.2% of chlorine.

Blends of the thus prepared crosslinked copolymer with varying proportions of polypropylene are prepared by milling the respective mixtures for 10 minutes on a two-roll mill in which the front roll is at a temperature of 185° C. and back roll is at 130° C. As shown in the following table, the resulting blends display reduced flammability upon having their limiting oxygen index (LOI) determined by means of the procedure described by Fenimore and Martin in the November 1966 issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy.

Flammability of polypropylene blends

Blend composition, wt. crosslinked polymer/wt. polypropylene: | LOI value
--- | ---
0/100 | 17.6
20/100 | 20.6
30/100 | 21.7

Part B.—A polymer blend of 2.5 parts of the crosslinked copolymer whose preparation is described in Part A, hereinabove, and 7.5 parts of an ABS resin sold under the trademark "Blendex 311" by the Marbon Chemical Division of the Borg-Warner Corporation is prepared by simple physical mixing using a micro-mill. This mixture is then pressed into a thin film with a thickness of about 3 mm. at 325° F. under a pressure of 40,000 p.s.i. The resulting film shows good flame retardancy having an LOI value of 21.9 whereas a film of "Blendex 311" prepared by the same procedure but devoid of the novel copolymer additive of this invention has an LOI value of only 17.4.

Comparable results are obtained upon blending this crosslinked copolymer additive with various burning thermoplastics including polymethyl methacrylate, polyethylene, polypropylene, cellulose acetate, nylon 66, polyphenylene oxide, polycarbonate, polyurethane and polyvinyl chloride resins.

EXAMPLE II

This example illustrates the preparation of a crosslinked 50:10:40 bis(beta-chloroethyl) vinylphosphonate: allyl methacrylate:vinyl chloride copolymer by means of a suspension polymerization procedure and its subsequent use in preparing a fire retardant, thermoplastic polymer composition.

Part A.—Fifty (50) parts of bis(beta-chloroethyl) vinylphosphonate and 10 parts of allyl methacrylate are added to a suspension mixture comprising 0.5 part of methyl cellulose and 300 parts of deionized, distilled water. The mixture is cooled down to −5° C. and 1.5 parts of t-butyl peroxypivalate and 40 parts of vinyl chloride are added to the reaction vessel. Polymerization is carried out at 60° C. for 12 hours with constant stirring. The resulting polymer is collected by filtration and washed thoroughly with distilled water. The washed polymer is dried in a current of air at 40° C. for 48 hours. Ninety-two (92) parts of dry polymer containing 6.6% of phosphorus and 22.7% of chlorine are obtained. A number of blends of the resulting crosslinked copolymer with varying proportions of polypropylene are prepared in the manner described in Example I. The flammability of these blends, as expressed in terms of their LOI values, is set forth in the following table.

Blend composition, wt. crosslinked copolymer/wt. polypropylene: | LOI value
--- | ---
0/100 | 17.6
20/100 | 20.4
30/100 | 21.9

Comparable results, with respect to the flame retardancy of the final polymer blends are achieved using a crosslinked copolymer additive copolymer containing 20 parts, by weight, of allyl methacrylate and 80 parts, by weight, respectively of each of the following bis(hydrocarbyl) vinylphosphonate monomers:

bis(beta-chloroethyl) 1-cyanovinylphosphonate,
bis(beta-chloropropyl) vinylphosphonate,
bis(beta-chloroethyl) 1-phenylvinylphosphonate,
di-n-butyl vinylphosphonate and
diphenyl vinylphosphonate.

EXAMPLE III

This example illustrates the preparation of a crosslinked 30:10:60 bis(beta-chloroethyl) vinylphosphonate: allyl methacrylate:vinyl chloride copolymer by means of a suspension polymerization procedure.

Thirty (30) parts bis(beta-chloroethyl) vinylphosphonate, 10 parts of allyl methacrylate and a suspension mixture consisting of 0.5 part of methylcellulose and 300 parts of deionized, distilled water are cooled down to −5° C. In a reaction vessel. One and one-half (1.5) parts of t-butyl peroxypivalate and 60 parts of vinyl chloride are added to the reaction vessel. After the reaction vessel is purged with nitrogen and capped, the reaction is carried out at 60° C. for 12 hours with constant stirring. The polymer is collected by filtration and is then washed and dried. A yield of 98% is obtained. The thus prepared crosslinked copolymer will not burn in air and cannot even be ignited.

EXAMPLE IV

This example illustrates the preparation of a crosslinked 80:20 bis(beta-chloroethyl) vinylphosphonate: butylene glycol:methacrylate copolymer by means of an emulsion polymerization procedure.

A mixture of 390 parts of deionized, distilled water, 50 parts of a 1%, by weight, aqueous sodium bicarbonate solution, 25 parts of a 5%, by weight, aqueous polyvinyl alcohol solution and 10 parts of a 10%, by weight, aqueous sodium lauryl sulfate solution is heated to 75° C. in a 2-liter three-necked flask under a blanket of nitrogen. Fifty (50) parts of a 3%, by weight, aqueous potassium persulfate solution are added and the monomer emulsion, comprising 160 parts of bis(beta-chloroethyl) vinylphosphonate, 40 parts of butylene glycol dimethacrylate, 10 parts of 10%, by weight, aqueous sodium lauryl sulfate solution, 25 parts of a 5%, by weight, aqueous polyvinyl alcohol solution and 240 parts of deionized, distilled water is added, dropwise, over a period of 2.5 hours. The temperature is maintained at 75–80° C. throughout the addition whereupon the temperature is raised to 90° C. for a period of 30 minutes. The resulting resin is filtered off and is then washed and dried. One hundred and sixty-five (165) grams of dried resin are recovered representing a yield of 82.5%. The thus prepared polymer will not burn in air and cannot even be ignited.

EXAMPLE V

This example illustrates the preparation of a 80:20 bis(beta-chloroethyl) vinylphosphonate:allyl methacrylate copolymer by means of an emulsion polymerization procedure.

A mixture of 160 parts of bis(beta-chloroethyl) vinylphosphonate, 40 parts of a 10%, by weight, aqueous sodium lauryl sulfate solution, 50 parts of a 5%, by weight, aqueous polyvinyl alcohol solution, 50 parts of a 1%, by weight, aqueous sodium bicarbonate solution and 630 parts of deionized, distilled water are placed in a 3-necked 2-liter flask under a nitrogen blanket. This mixture is heated to 75° C. and 50 parts of a 3%, by weight, aqueous potassium persulfate solution is added. Immediately thereafter, dropwise addition of allyl methacrylate is initiated and continued over a 2.5 hour period. The temperature is maintained at 78° C. for 22 hours after which time an additional 0.5 parts of potassium persulfate in 50 parts of water is added. After one hour, the reactor is cooled to room temperature. The product has the appearance of a soft flocculated latex which is isolated by filtration of the precipitated polymer followed by washing and drying. A yield of 96% is obtained. The resulting crosslinked polymer contains 10%, by weight, of phosphorus and will not burn in air and cannot even be ignited.

EXAMPLE VI

This example illustrates the superior results obtained by the use of allyl methacrylate as the crosslinking comonomer, i.e. as the polyfunctional comonomer, in running the process of preparing the novel crosslinked copolymers of this invention.

Part A.—The suspension polymerization procedure of Example I, hereinabove, is repeated with 20 parts of ethylene glycol dimethacrylate and 20 parts of divinyl benzene being each, in turn, substituted for the 20 parts of allyl methacrylate used in the procedure of Example I. The results of this comparison, with respect to the weight percent conversion of the bis(beta-chloroethyl) vinylphosphonate copolymer, are set forth in the following table.

| Crosslinking comonomer: | Conversion (wt.-percent) |
|---|---|
| Allyl methacrylate | 93.0 |
| Ethylene glycol dimethacrylate | 88.5 |
| Divinyl benzene | 73.3 |

Part B.—The emulsion polymerization procedure of Example IV, hereinabove, is repeated with 40 parts of diethylene glycol dimethacrylate and 40 parts of divinyl benzene being each, in turn, substituted for the 40 parts of allyl methacrylate used in the procedure of Example IV. The results of this comparison, with respect to the weight percent conversion of the bis(beta-chloroethyl) vinylphosphonate to the copolymer are set forth in the following table.

| Crosslinking comonomer: | Conversion (wt.-percent) |
|---|---|
| Allyl methacrylate | 98 |
| Ethylene glycol dimethacrylate | 75 |
| Divinyl benzene | 68 |

EXAMPLE VII

This example illustrates the preparation of a crosslinked 50:10:40 bis(beta-chloroethyl) vinylphosphonate: divinyl benzene:styrene copolymer by means of a suspension polymerization procedure as well as its subsequent use in preparing a fire retardant, thermoplastic polymer composition.

A solution of 0.4 parts of methyl cellulose and 340 parts of deionized, distilled water is charged into a reaction vessel. A monomeric mixture comprising 50 parts of bis(beta-chloroethyl) vinylphosphonate, 40 parts of styrene, and 10 parts of divinyl benzene is added whereupon 2 parts of benzoyl peroxide are introduced. The free space in the vessel is flushed with nitrogen and the vessel is then sealed, heated to 80° C. and maintained at this temperature for a period of 12 hours. At the end of this period, the resulting polymer is filtered and collected. After being washed thoroughly with deionized, distilled water, the copolymer is dried in a current of air at 60° C. for 8 hours and then in a vacuum over for 24 hours at 80° C.

There is thus obtained 84 parts of dry crosslinked copolymer which will not burn in air.

Five grams of the above described copolymer are thoroughly mixed with 5 grams of polystyrene using a micro-mill. An attractive molding film is then prepared by subjecting this mixture to a pressure of 30,000 p.s.i. at 300° F. for a period of one minute. This film showed reduced flammability evidenced by its LOI value of 22.1 as compared to an unmodified polystyrene which has an LOI value of 18.1.

Variations may be made in proportions, procedures and materials without departing from the scope of this invention as defined by the following claims.

What is claimed is:

1. A solid crosslinked copolymer consisting of: (1) from about 2–60%, by weight of the total copolymer of at least one polyfunctional ethylenically unsaturated monomer selected from the group consisting of allyl methacrylate, divinyl benzene, diethylene glycol dimethacrylate, trimethylolpropane trimethacrylate, methylene-bis-acrylamide, diethylene glycol diacrylate, ethylene glycol diacrylate, divinyl ether, diallyl furmarate, diallyl phthalate, divinyl sulfone, butylene dimethacrylate, trimethylene glycol diacrylate, butylene glycol diacrylate, pentamethylene glycol diacrylate, glyceryl triacrylate, octylene glycol diacrylate, trimethylene propane triacrylate, tetraacrylate ester of pentaerythritol and diallyl phosphonate, and (2) the remainder being at least one bis(hydrocarbyl) vinylphosphonate having the structure:

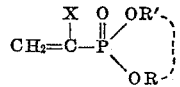

wherein X is selected from the group consisting of hydrogen, halogen, cyano, aryl, and haloaryl, $C_1$–$C_{18}$ alkyl and haloalkyl, and

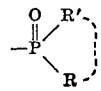

wherein R and R' are hydrocarbyl and substituted hydrocarbyl groups having non-interfering substituents, said hydrocarbyl and said substituted hydrocarbyl containing up to about 18 carbon atoms inclusive with the proviso that R and R' can be the same, different or conjoint.

2. The copolymer of claim 1, wherein said polyfunctional ethylenically unsaturated monomer is allyl methacrylate.

3. The copolymer of claim 1 wherein said bis(hydrocarbyl) vinylphosphonate is bis(beta-chloroethyl) vinylphosphonate.

4. A dry particulate mass of the copolymer of claim 1.

5. A solid crosslinked copolymer consisting of from about 2–60%, by weight of a polyfunctional ethylenically unsaturated monomer selected from the group consisting of allyl methacrylate, divinyl benzene, diethylene glycol dimethacrylate, trimethylol propane trimethacrylate, methylene-bis-acrylamide, diethylene glycol diacrylate, ethylene glycol diacrylate, divinyl ether, diallyl fumarate, diallyl phthalate, divinyl sulfone, butylene dimethacrylate, trimethylene glycol diacrylate, pentamethylene glycol diacrylate, glyceryl triacrylate, octylene glycol diacrylate, trimethylene propane triacrylate, tetraacrylate ester of pentaerythritol and diallyl phosphonate and the remainder being bis(beta-chloroethyl)vinylphosphonate.

6. The copolymer of claim 5, wherein said polyfunctional ethylenically unsaturated monomer is allyl methacrylate.

7. A solid crosslinked copolymer consisting of allyl methacrylate and bis(beta-chloroethyl) vinylphosphonate.

8. The crosslinked copolymer consisting of claim 7 wherein said allyl methacrylate is present in a concentration of from about 2-60%, by weight, the remainder being said bis(beta-chloroethyl) vinylphosphonate.

9. The copolymer of claim 1 wherein said polyfunctional ethylenically unsaturated monomer is diallyl phthalate.

References Cited
UNITED STATES PATENTS

| | | | |
|---|---|---|---|
| 3,062,792 | 11/1962 | McConnell et al. | 260—86.1 R |
| 3,227,696 | 1/1966 | Flowers et al. | 260—86.1 R |
| 3,243,417 | 3/1966 | Kirby | 260—86.1 R |
| 3,489,706 | 1/1970 | Mikofalvy | 260—86.1 R |
| 3,519,607 | 7/1970 | Welch | 260—86.1 R |

WILLIAM H. SHORT, Primary Examiner

L. M. PHYNES, Assistant Examiner

U.S. Cl. X.R.

260—17 R, 17.4 ST, 29.6 T, 30.6 HR, 3.18 HR, 45.7 P, 45.75 R and K, 45.8 A and NZ, 45.85, 78.5 HC and UA, 79.3 M, 80.71, 86.1 R, 87.1, 884, 899